US006240970B1

(12) United States Patent
Ostrander et al.

(10) Patent No.: US 6,240,970 B1
(45) Date of Patent: Jun. 5, 2001

(54) TUBING FOR HANDLING HYDROCARBON MATERIALS AND HAVING AN OUTER JACKET LAYER ADHERED THERETO

(75) Inventors: James E. Ostrander, Rochester; Rick Kalinowski; David A. Bensko, both of Oscoda; Peter J. Studders, Bay City; David H. Czarnik, Twining, all of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/283,033

(22) Filed: Apr. 1, 1999

(51) Int. Cl.[7] ....................................... F16L 11/06
(52) U.S. Cl. ................... 138/137; 138/141; 138/DIG. 1; 138/DIG. 3; 138/DIG. 7; 428/36.91
(58) Field of Search ..................... 138/137, 138, 138/140, 141, DIG. 1, DIG. 3, DIG. 7, 124, 127; 361/215; 428/36.91

(56) References Cited

U.S. PATENT DOCUMENTS

| 3,070,132 | 12/1962 | Sheridan . |
| 3,166,688 | 1/1965 | Rowand et al. . |
| 3,473,087 | 10/1969 | Slade . |
| 3,506,155 | 4/1970 | Auer . |
| 3,561,493 | 2/1971 | Maillard et al. . |
| 3,577,935 | 5/1971 | Reinhart et al. . |
| 3,692,889 | 9/1972 | Hetrich . |
| 3,751,541 | 8/1973 | Hegler . |

(List continued on next page.)

FOREIGN PATENT DOCUMENTS

| 1779905 | 2/1972 | (DE) . |
| 2906317 | 8/1979 | (DE) . |
| 3821723 | 9/1989 | (DE) . |
| 3827092 | 9/1989 | (DE) . |
| 9001467 | 4/1990 | (DE) . |
| 4001125 | 12/1990 | (DE) . |
| 4001126 | 12/1990 | (DE) . |
| 9007303 | 12/1990 | (DE) . |

(List continued on next page.)

OTHER PUBLICATIONS

Atochem, Inc., *Safety Data Sheet for ADEFLON A*, 2 pp., prior to Nov. 1992.
James M. Margolis, Editor, *Conductive Polymers and Plastics*, ch. 4, pp. 119–124 (Chapman & Hall, New York), Jan. 1989.
Central Glass Co., Ltd., Material Safety Data Sheet for CEFRAL Soft Conductive XPV–504KRC, May 28, 1992.
Kirk–Othmer, *Encyclopedia of Chemical Technology*, 3d ed., vol. 18, pp. 406–425 (John Wiley & Sons, New York) (Jan. 1982).

(List continued on next page.)

*Primary Examiner*—James Hook
(74) *Attorney, Agent, or Firm*—Robert P. Seitter

(57) ABSTRACT

An elongated multi-layer tubing for connection to a motor vehicle system to handle fluids containing hydrocarbons. The tubing comprises an inner layer disposed radially innermost and having an inner surface capable of prolonged exposure to a fluid containing hydrocarbons, the inner layer formed from an extrudable, melt-processible thermoplastic, such as Nylon 12. An outer jacket layer is formed from an extrudable, melt-processible thermoplastic, such as a thermoplastic elastomer (TPE). The tubing further comprises an anhydride-modified, linear low-density polyethylene intermediate layer extruded between the inner and outer layers, the intermediate layer sufficiently adhering the inner layer to the outer jacket to substantially prevent slipping therebetween. At least one of the inner and intermediate layers is resistant to permeation by hydrocarbons. At least one layer of the tubing is capable of dissipating electrostatic energy in a range of $10^4$ to $10^9$ Ohm/cm$^2$.

18 Claims, 2 Drawing Sheets

U.S. PATENT DOCUMENTS

| | | |
|---|---|---|
| 3,791,915 | 2/1974 | Goehring et al. . |
| 3,828,112 | 8/1974 | Johansen et al. . |
| 3,838,713 | 10/1974 | Tubbs . |
| 3,907,955 | 9/1975 | Viennot . |
| 4,059,847 | 11/1977 | Phillips et al. . |
| 4,136,143 | 1/1979 | Lupke et al. . |
| 4,211,595 | 7/1980 | Samour . |
| 4,218,517 | 8/1980 | Van Ooij . |
| 4,243,724 | 1/1981 | Strutzel et al. . |
| 4,244,914 | 1/1981 | Ranalli et al. . |
| 4,272,585 | 6/1981 | Strassel . |
| 4,273,798 | 6/1981 | Scheiber . |
| 4,289,727 | 9/1981 | Herrington, Jr. . |
| 4,303,457 | 12/1981 | Johansen et al. . |
| 4,330,017 | 5/1982 | Satoh et al. . |
| 4,371,583 | 2/1983 | Nelson . |
| 4,424,834 | 1/1984 | Sumi et al. . |
| 4,448,748 | 5/1984 | Radtke et al. . |
| 4,455,204 | 6/1984 | Pieslak et al. . |
| 4,496,444 | 1/1985 | Bagnulo . |
| 4,500,577 | 2/1985 | Satake et al. . |
| 4,501,629 | 2/1985 | Satzler . |
| 4,588,546 | 5/1986 | Feil et al. . |
| 4,601,948 | 7/1986 | Lancaster et al. . |
| 4,606,953 | 8/1986 | Suzuki et al. . |
| 4,614,208 | 9/1986 | Skarelius . |
| 4,659,625 | 4/1987 | Decroly et al. . |
| 4,675,780 | 6/1987 | Barnes et al. . |
| 4,685,090 | 8/1987 | Krevor . |
| 4,706,713 | 11/1987 | Sadamitsu et al. . |
| 4,710,337 | 12/1987 | Nordstrom . |
| 4,732,632 | 3/1988 | Pieslak et al. . |
| 4,758,455 | 7/1988 | Campbell et al. . |
| 4,762,589 | 8/1988 | Akiyama et al. . |
| 4,800,109 | 1/1989 | Washizu . |
| 4,853,297 | 8/1989 | Takahashi et al. . |
| 4,880,036 | 11/1989 | Kitami et al. . |
| 4,885,215 | 12/1989 | Yoshioka et al. . |
| 4,887,647 | 12/1989 | Igarashi et al. . |
| 4,907,625 | 3/1990 | Ito et al. . |
| 4,907,830 | 3/1990 | Sasa et al. . |
| 4,944,972 | 7/1990 | Blembereg . |
| 4,948,643 | 8/1990 | Mueller . |
| 4,984,604 | 1/1991 | Nishimura . |
| 4,990,383 | 2/1991 | Bergstrom et al. . |
| 5,019,309 | 5/1991 | Brunnhofer . |
| 5,038,833 | 8/1991 | Brunnhofer . |
| 5,039,743 | 8/1991 | Machado . |
| 5,043,389 | 8/1991 | Gergen et al. . |
| 5,076,329 | 12/1991 | Brunnhofer . |
| 5,080,405 | 1/1992 | Sasa et al. . |
| 5,082,511 | 1/1992 | Farina et al. . |
| 5,084,518 | 1/1992 | George et al. . |
| 5,112,692 | 5/1992 | Strassel et al. . |
| 5,129,429 | 7/1992 | Winter et al. . |
| 5,135,976 | 8/1992 | Van Helden et al. . |
| 5,141,427 | 8/1992 | Hegler et al. . |
| 5,142,782 | 9/1992 | Martucci . |
| 5,143,122 | 9/1992 | Adkins . |
| 5,148,837 | 9/1992 | Agren et al. . |
| 5,167,259 | 12/1992 | Brunnhofer . |
| 5,170,011 | 12/1992 | Martucci . |
| 5,219,002 | 6/1993 | Stenger et al. . |
| 5,219,003 | 6/1993 | Kerschbaumer . |
| 5,258,213 | 11/1993 | Mugge et al. . |
| 5,277,228 | 1/1994 | Yamanashi . |
| 5,284,184 | 2/1994 | Noone et al. . |
| 5,313,987 | 5/1994 | Rober et al. . |
| 5,362,529 | 11/1994 | Mugge et al. . |
| 5,362,570 | 11/1994 | Rober et al. . |
| 5,373,870 | 12/1994 | Derroire et al. . |
| 5,380,385 | 1/1995 | Derroire et al. . |
| 5,383,087 | 1/1995 | Noone et al. . |
| 5,389,410 | 2/1995 | Mugge et al. . |
| 5,390,808 | 2/1995 | Choma et al. . |
| 5,404,915 | 4/1995 | Mugge et al. . |
| 5,425,817 | 6/1995 | Mugge et al. . |
| 5,427,831 | 6/1995 | Stevens . |
| 5,449,024 | 9/1995 | Rober et al. . |
| 5,460,771 | 10/1995 | Mitchell et al. . |
| 5,469,892 | 11/1995 | Noone et al. . |
| 5,472,784 | 12/1995 | Rober et al. . |
| 5,473,311 | 12/1995 | Reynolds . |
| 5,474,822 | 12/1995 | Rober et al. . |
| 5,478,620 | 12/1995 | Mugge et al. . |
| 5,500,263 | 3/1996 | Rober et al. . |
| 5,508,099 * | 4/1996 | Incorvia ............................ 428/265 |
| 5,520,223 | 5/1996 | Iorio et al. . |
| 5,524,673 | 6/1996 | Noone et al. . |
| 5,538,039 | 7/1996 | Harde et al. . |
| 5,554,425 | 9/1996 | Krause et al. . |
| 5,560,398 | 10/1996 | Pfleger . |
| 5,566,720 | 10/1996 | Cheney et al. . |
| 5,570,711 | 11/1996 | Walsh . |
| 5,590,691 | 1/1997 | Iorio et al. . |
| 5,653,266 | 8/1997 | Reynolds et al. . |
| 5,678,611 | 10/1997 | Noone et al. . |
| 5,679,425 | 10/1997 | Plumley . |
| 5,706,864 | 1/1998 | Pfleger . |
| 5,716,684 | 2/1998 | Stoeppelmann et al. . |
| 5,718,957 | 2/1998 | Yokoe et al. . |
| 5,743,304 | 4/1998 | Mitchell et al. . |
| 5,763,034 | 6/1998 | Nishino et al. . |
| 5,853,862 * | 12/1998 | Murai et al. ........................ 428/215 |
| 5,865,218 | 2/1999 | Noone et al. . |
| 5,884,671 | 3/1999 | Noone et al. . |
| 5,884,672 | 3/1999 | Noone et al. . |
| 5,894,865 | 4/1999 | Winter et al. . |
| 5,901,755 | 5/1999 | Winter et al. . |
| 5,996,642 * | 12/1999 | Noone et al. ........................ 138/137 |

FOREIGN PATENT DOCUMENTS

| | | |
|---|---|---|
| 3942354 | 6/1991 | (DE) . |
| 4006870 | 7/1991 | (DE) . |
| 4025301 | 4/1992 | (DE) . |
| 42 32 946 A1 | 4/1993 | (DE) . |
| 4137430 | 5/1993 | (DE) . |
| 4214383 | 9/1993 | (DE) . |
| 9400522 | 1/1994 | (DE) . |
| 9319879 | 4/1994 | (DE) . |
| 9402180 | 5/1994 | (DE) . |
| 0117669 | 9/1984 | (EP) . |
| 0164766 | 12/1985 | (EP) . |
| 0436923 | 7/1991 | (EP) . |
| 0465252 | 1/1992 | (EP) . |
| 0551094 | 7/1993 | (EP) . |
| 0569101 | 11/1993 | (EP) . |
| 0816067 | 1/1998 | (EP) . |
| 2114550 | 6/1972 | (FR) . |
| 2577168 | 8/1986 | (FR) . |
| 2577564 | 8/1986 | (FR) . |
| 2579290 | 9/1986 | (FR) . |
| 2688858 | 9/1993 | (FR) . |
| 2747175 | 10/1997 | (FR) . |
| 2204376 | 11/1988 | (GB) . |
| 2211266 | 6/1989 | (GB) . |
| 46-9667 | 3/1971 | (JP) . |
| 55-97933 | 7/1980 | (JP) . |
| 60-32627 | 2/1985 | (JP) . |
| 93/25835 | 12/1993 | (WO) . |
| 94/07673 | 4/1994 | (WO) . |

| | | |
|---|---|---|
| 94/09302 | 4/1994 | (WO) . |
| 94/09303 | 4/1994 | (WO) . |
| 95/21051 | 8/1995 | (WO) . |
| 95/27866 | 10/1995 | (WO) . |
| 95/30105 | 11/1995 | (WO) . |
| 97/44186 | 11/1997 | (WO) . |

OTHER PUBLICATIONS

Shell Chemical Company, *Kraton Rubber—Compounds Properties Guide*, prior to Apr. 1994.

Shell Chemical Company, *Kraton Thermoplastic Rubber—Processing & Fabricating Kraton Themoplastic Rubber Compounds*, pp. 1–26 (Apr. 1988).

Shell Chemical Company, *Kraton Rubber Automotive Compound Characteristics*, prior to Apr. 1994.

Shell Chemical Company, *Kraton Thermoplastic Rubber—Typical Properties 1990*, pp. 1–11 (Feb. 1990).

Advanced Elastomer Systems, *Material Safety Data—Santoprene Thermoplastic Rubber FR Grades*, pp. 1–5 (Dec. 1, 1990).

Central Glass Co., Ltd., *Material Safety Data Sheet—XUA–2U*, pp. 1–2 (Mar. 18, 1991).

Shell Chemical Company, *Material Safety Data Sheet—Kraton G7455X Thermoplastic Rubber*, pp. 1, 3, 5 (Aug. 10, 1990).

SAE Standard, *Nonmetallic Air Brake System Tubing—SAE J844*, pp. 203–208 (Jun. 1990).

International Plastics Selector, *Plastics Digest—Thermoplastics and Thermosets*, ed. 14, vol. 2, pp. 216–219, 1283–1284 (Jan. 1993).

EMS –American Grilon Inc., *EMS Engineering Polymers—Product Data Bulletin—GRILAMID L25FVS40—GRILAMID L25F10*, prior to Feb. 1993.

Huls America Inc., *Product Information—Vestamid Nylon 12*, prior to Jan. 1995.

Donald V. Rosato, David P. Di Mattia, & Dominick V. Rosato, *Designing with Plastic & Composites: A Handbook*, pp. 210–223 (Van Nostrand Reinhold, New York) (Jan. 1991).

Advanced Elastomer Systems, *Santoprene Thermoplastic Rubber—Product Data Sheet—251–80*(Nov. 1991).

Advanced Elastomer Systems, *Santoprene Thermoplastic Rubber—Fluid Resistance*, pp. 1–12 (Jan. 1992).

DSM Thermoplastic Elastomers Inc., *Sarlink 1000 Series—Material Safety Data Sheet*, pp. 1–4 (Jan. 14, 1992).

Novacor Chemicals Inc., *Sarlink Thermoplastic Elastomers—The Alternative TPEs*, prior to Apr. 1994.

Novacor Chemicals Inc., *Data Sheet—Sarlink 1570—Fuel Resistant Thermoplastic Elastomer for Marine Hose Applications*(data sheets for other products included) (Nov. 1989).

ASTM Standard B 750, *Standard Specification for Zinc—5 Aluminum –Mischmetal Alloy(UNS Z38510) in Ingot Form for Hot–Dip Coatings*, pp. 669–670, Jan. 1988.

State of California—Air Resources Board, *Public Hearing to Consider Amendments . . . Regarding Evaporative Emissions Standards. . .* , pp. 1.2, A1–A4, B1–B43 (Aug. 9, 1990).

DuPont Corporation, *Tefzel Fluropolymer—Safety in Handling and Use*, pp. 1–3, 20–21, 35–37, prior to Apr. 1992.

Vichem Corporation, *Vinyl Compounds—Material Safety Data Sheet—V220–85E–7261* (May 1990).

ASTM, *Designation: D 256 –93a—Standard Test Methods for Determining the Pendulum Impact Resistance of Notched Specimens of Plastics*, pp. 1–18 (Jan. 1993).

Joseph E. Shigley & Larry D. Mitchell, *Mechanical Engineering Design*, p. 177, 4th ed. (McGraw–Hill Book Company, New York), (Jan. 1983).

Kenneth Wark, *Thermodynamics*, p. 15, 4th ed. (McGraw–Hill Book Company, New York) (Jan. 1983).

Eugene A. Avallone & Theodore Baumeister III, *Marks' Standard Handbook for Mechanical Engineers*, p. 1–24, 9th ed. (McGraw–Hill Book Company, New York) (Jan. 1978).

ICI Americans Inc.—LNP Engineering Plastics, *A Guide to Statically Conductive Advanced Material Composites—Bulletin 223–889*, Aug. 1989.

DuPont Corporation, *Bynel (adhesive resin)—Series 4100 Including. . . Anhydride–Modified, Linear Low–Density Polyethylene*(Aug. 25, 1997).

Teknor Apex Co. (Plastics Division), *TPE Compounds*, prior to Apr. 1998.

International Search Report for PCT/US00/08816, Sep. 2000.

\* cited by examiner

TUBING FOR HANDLING HYDROCARBON MATERIALS AND HAVING AN OUTER JACKET LAYER ADHERED THERETO

BACKGROUND OF THE INVENTION

The present invention relates to tubing for use in a motor vehicle. More particularly, the present invention relates to a multi-layer tube which can be employed for transporting hydrocarbon fluids. For example, the multi-layer tube may be used as a fuel line and/or vapor recovery line of a motor vehicle.

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. It is also imperative that the fuel line employed be impervious to interaction with corrosive materials present in the fuel such as oxidative agents and surfactants, as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials, such as aliphatic hydrocarbons, alcohols and other materials present in fuel blends, to the outer layer. The materials of choice for the inner layer are polyamides such as Nylon 6, Nylon 6.6, Nylon 11 and Nylon 12.

Alcohol and aromatics in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials, such as Nylon 11 and Nylon 12, into the liquid. The presence of copper ions, which can be picked up from the fuel pump, accelerates this crystallization. The crystallized precipitate can block filters and fuel injectors and collect to limit travel of the fuel-pump, as well as build up on critical control surfaces of the fuel pump.

Heretofore it has been extremely difficult to obtain satisfactory lamination characteristics between polymer layers comprising an inner tubing substrate and an outer jacket layer Such lamination or bonding may be quite important to prevent slipping of an outer jacket layer with respect to an inner layer during assembly of connectors or the like to the inner tubing substrate. In the industry, fuel and/or vapor line barbed connectors are inserted firmly into the interior opening of the inner tubing substrate. However, if the connector is not inserted properly, it may during insertion abut the radial thickness of the inner tubing substrate. On occasion, it has been found in such circumstances that the inner tubing substrate may slip back within the outer jacket, unbeknownst to the assembly worker. As such, the overhang of the outer jacket past the terminated end of the inner tubing substrate may mask or hide an incorrect and/or incomplete assembly of the connector into the end of the inner tubing substrate. As can readily be appreciated, such an incorrect assembly of the connector to a fuel and/or vapor line may result in undesirable leakage of fuel and/or vapors.

In order to correct this potential problem, attempts have been made to glue and/or adhere an outer jacket to an inner tubing substrate. However, during the crosshead extrusion of a polymeric outer jacket onto an inner tubing substrate, the temperature may reach about 350° F. or higher. At this temperature, conventional glues, adhesives and the like burn off, flash off and/or otherwise decompose undesirably. In addition to failing to provide suitable bonding between an outer jacket and an inner tubing substrate, the use of conventional glues, adhesives and the like may adversely affect the inner tubing substrate and/or the equipment used during the process.

Thus, it is an object of the present invention to provide tubing which could advantageously be employed in motor vehicles, wherein the tubing is composed of at least an inner tubing substrate layer and an outer jacket layer, wherein the two layers are sufficiently bonded to advantageously substantially prevent slipping therebetween. It is a further object of the present invention to provide an extrudable adhesive between the two layers, which adhesive advantageously becomes tacky during crosshead extrusion of the jacket layer thereover without running off, burning or flashing off. It is yet another object of the present invention to provide tubing which would be durable and prevent or reduce permeation of organic materials therethrough. It is a further object of the present invention to provide tubing which would be essentially nonreactive with components of the liquid being conveyed therein. Still further, it is an object of the present invention to provide tubing which would advantageously be capable of preventing the buildup of electrostatic charge therein and/or would be capable of safely dissipating any electrostatic charge induced therein.

SUMMARY OF THE INVENTION

The present invention addresses and solves the above-mentioned problems and meets the enumerated objects and advantages, as well as others not enumerated, by providing an elongated multi-layer tubing for connection to a motor vehicle system to handle fluids containing hydrocarbons. The multi-layer tube of the present invention is suitable for connection to a motor vehicle system to transport fluids containing hydrocarbons such as in a fuel line, a vapor return line or vapor recovery line. The tubing comprises an inner layer disposed radially innermost and having an inner surface capable of prolonged exposure to a fluid containing hydrocarbons, the inner layer formed from an extrudable, melt-processible thermoplastic material. An outer jacket layer is formed from an extrudable, melt-processible thermoplastic material. The tubing further comprises an intermediate layer extruded between the inner layer and the outer jacket layer, the intermediate layer sufficiently adhering the inner layer to the outer jacket to substantially prevent slipping therebetween. At least one of the inner and intermediate layers is resistant to permeation by hydrocarbons. The tubing of the present invention further comprises at least one layer of the tubing being capable of dissipating electrostatic energy in a range between about $10^4$ to $10^9$ Ohm/cm².

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
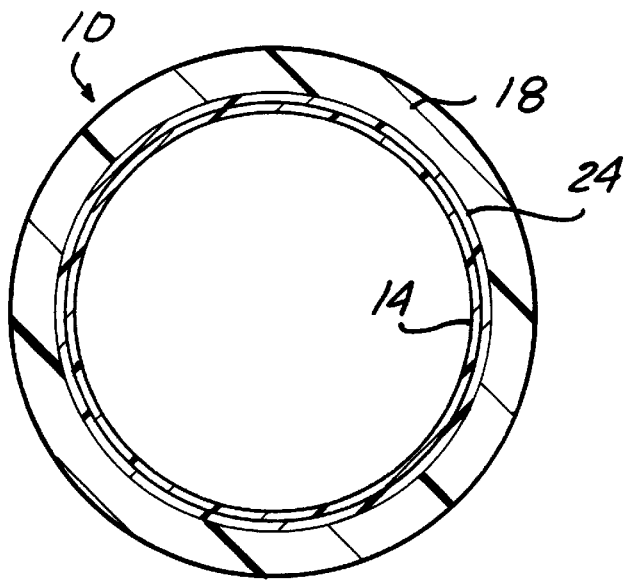
FIG. 1 is a sectional view through a piece of tubing having three layers according to the present invention.

The present invention is a multi-layer fuel line/tube and/or vapor tube 10 which contains at least an inner or first layer 14, at least one bonding or second layer 24, and at least an outer jacket layer 18. The tubing 10 of the present invention is, preferably, fabricated by co-extruding given thermoplastic materials in a conventional co-extrusion process. The tubing 10 may either be co-extruded to a suitable length or may be co-extruded in continuous length and cut to fit the given application subsequently. The tubing 10 of the present invention may have an outer diameter up to about 50 mm. However, in applications such as fuel lines and vapor recovery systems, outer diameters of up to about 63.5 mm (2.5 inches) may be preferred.

Figure 2:
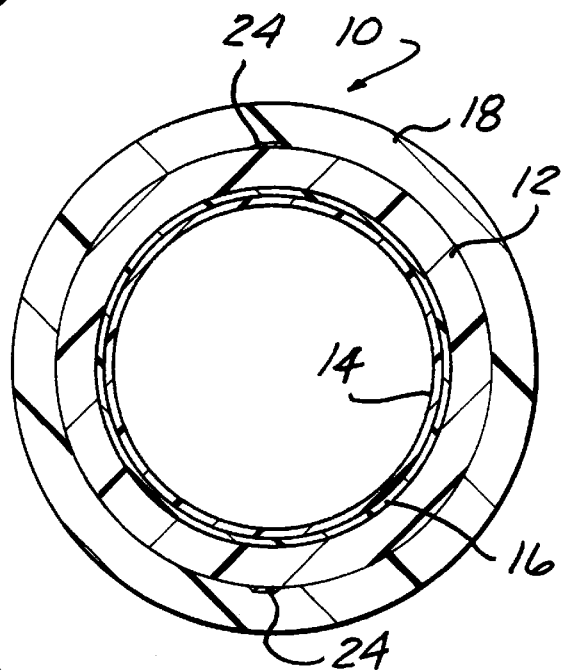
FIG. 2 is a sectional view through a piece of tubing having four layers according to the present invention.
Figure 3:
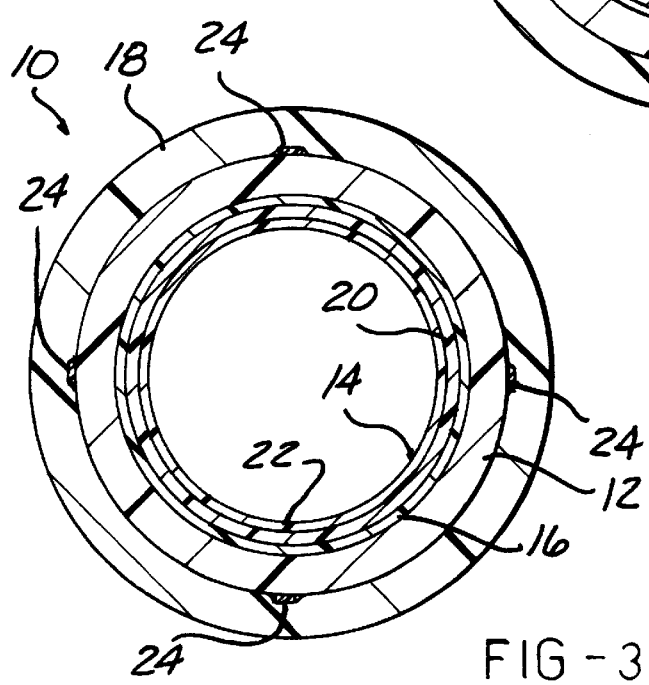
FIG. 3 is a sectional view through a piece of tubing having five layers according to the present invention.

In any of the embodiments disclosed herein, the tubing 10 of the present invention may include the outer jacket layer 18 which surrounds the inner tubing substrate, as shown in FIGS. 1–3. The jacket 18 may be either co-extruded with the other layers during the extrusion process or may be put on in a subsequent process such as crosshead extrusion. The outer jacket 18 may be made of any material chosen for its structural (such as abrasion resistance) or insulating characteristics, and may be of any suitable wall thickness. In the preferred embodiment, the outer jacket 18 may be made of a thermoplastic material selected from the group consisting of zinc-chloride resistant Nylon 6, Nylon 11, Nylon 12, polyether block amides, polypropylene, and thermoplastic elastomers such as: SANTOPRENEO®, a thermoplastic rubber composition commercially available from Advanced Elastomer Systems of St. Louis, Mo.; KRATON®, a thermoplastic rubber composition composed of a styrene-ethylene/butylenestyrene block copolymer commercially available from Shell Chemical Co. of Houston, Tex.; VICHEM, a family of polyvinyl chloride compounds commercially available from Vichem Corporation of Allendale, Mich.; SARLINK, an oil resistant thermoplastic composition commercially available from Novacor Chemicals of Leominster, Mass.; and UNIPRENE, a thermoplastic elastomer commercially available from Teknor Apex of Pawtucket, R.I. One preferred grade of SANTOPRENE® is #101-73. If desired, these materials may be modified to include flame retardants, plasticizers and the like.

The tubing 10 may have any suitable wall thickness, as desired. However, in automotive systems such as those described herein, wall thicknesses between about 0.5 mm and about 2.0 mm are generally employed, with wall thicknesses of approximately 0.8 mm to approximately 1.5 mm being preferred; and wall thicknesses between about 0.8 mm and about 1.25 mm being more preferred. While it is within the scope of this invention to prepare a tubing material having a plurality of overlying layers of various thermoplastic materials, the tubing 10 of the present invention generally has a maximum of five layers, inclusive of the bonding layers. In the preferred embodiment, the tubing material has three or four layers.

The tubing 10 of the present invention is suitable for use in motor vehicles, and may comprise a relatively thick outer layer 12 (as seen in FIGS. 2 and 3) which is non-reactive with the external environment and can withstand various shocks, vibrational fatigues and changes in temperature, as well as exposure to various corrosive or degradative compounds to which it would be exposed through the normal course of operation of the motor vehicle. Suitable materials for use in the present invention may be composed of any melt-processible extrudable thermoplastic material which is resistant to ultra violet degradation, extreme changes in heat, and exposure to gasoline and its additives. The material of choice may also exhibit resistance to environmental hazards such as exposure to zinc chloride, and resistance to degradation upon contact with materials such as engine oil and brake fluid.

It is anticipated that both the outer layer 12, and/or any interior layers, would be suitable for use at an outer service temperature range between about –40° C. and about 150° C., with a range of –20° C. to 120° C. being preferred. The various layers 12, 14, 16, 20 and 22 of the tubing 10 are sufficiently laminated to one another, and generally resistant to delamination throughout the lifetime of the tubing.

The tubing 10 thus formed will have a tensile strength of no less than about 25 N/mm$^2$ and an elongation value at break of at least 150%. The tubing 10 will have a burst strength at 23° C. and 120° C. of at least 20 bar. The multi-layer tubing 10 of the present invention is sufficiently resistant to exposure to brake fluid, engine oil and peroxides such as those which may be found in gasoline. The multi-layer tube 10 has the capability of withstanding impacts of at least 2 foot-pounds at temperatures below about –20° C.

Referring now to FIG. 1, the inner layer 14 is sufficiently bonded/adhered to the inner surface of the outer jacket layer 18. This bonding may take place by outer jacket layer 18 itself having chemical characteristics sufficient to bond to inner layer 14. For illustrative example, if inner layer 14 were comprised of Nylon 6, a thermoplastic elastomer (TPE) outer jacket layer 18 could adhere sufficiently thereto without need for intermediate layer 24. Two such suitable thermoplastic elastomers are SANTOPRENE® 191-55PA and SANTOPRENE® 191-85PA, thermoplastic rubbers commercially available from Advanced Elastomer Systems of St. Louis, Mo. It is anticipated that suitable TPEs could also adhere to other materials comprising inner layer 14.

The thermoplastic material employed in the inner layer 14 of the present invention is a melt-processible extrudable thermoplastic material resistant to extreme changes in heat and exposure to chemical components such as are found in engine oil and brake fluid. The thermoplastic material of choice may preferably be selected from the group consisting of 12 carbon block polyamides, 11 carbon block polyamides, zinc chloride resistant 6 carbon block polyamides, thermoplastic elastomers, and mixtures thereof The zinc chloride resistant 6 carbon block polyamides preferably exhibit a level of zinc chloride resistance greater than or equal to that required by Performance Requirement 9.6 as outlined in SAE Standard J844, i.e. non-reactivity after 200 hour immersion in a 50% by weight zinc chloride solution. A suitable 6-carbon block polyamide material is preferably a multi-component system comprised of a Nylon-6 copolymer blended with other Nylons and olefinic compounds. The zinc chloride resistant Nylon-6 of choice will have a melt temperature between about 220° C. and 240° C. Examples of Nylon (PA) materials suitable for use in the tubing 10 of the present invention are materials which can be obtained commercially under the tradenames M-7551 from NYCOA Corporation and ALLIED 1779 from Allied Chemical.

The thermoplastic elastomers which can successfully be employed in the tubing 10 of the present invention are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; VICHEM, a family of polyvinyl chloride compounds commercially available from Vichem Corporation of Allendale, Mich.; and UNIPRENE, which is a thermoplastic elastomer commercially available from Teknor Apex of Pawtucket; R.I.

The thermoplastic material employed in the inner layer 14 of the tubing 10 either may be identical to the material employed in the thick outer jacket 18, or may be a different thermoplastic selected from those listed above to take advantage of specific properties of the various thermoplastics. In a preferred embodiment, the inner layer 14 is composed of a polyamide such as Nylon 12; and the outer layer 18 is composed of a thermoplastic elastomer.

The thermoplastic material employed in the inner layer 14 may be either modified or unmodified If modified, it is anticipated that the material will contain various plasticizers as are readily known in the art. In the preferred embodiment, the polyamide will contain up to about 17% by composition weight plasticizer; with amounts between about 1% and about 13% being preferred.

The inner layer 14 may have a thickness sufficient to supply strength and chemical resistance properties to the multi-layer tubing 10. Specifically, the inner layer 14 is of sufficient thickness to impede permeation of aliphatic and aromatic hydrocarbon molecules and migration of those molecules through to the thick outer layer. In the present invention, the inner layer has a wall thickness less than that of the thick outer layer. In the preferred embodiment, the inner layer has a wall thickness between about 10% and 25% that of the outer layer; preferably less than between about 0.05 mm and about 0.4 mm; with a wall thickness between about 0.1 mm and about 0.3 mm being preferred.

In order to accomplish effective lamination of the two thermoplastic materials which compose the inner 14 and outer 12 layers, the tubing 10 of the present invention may also include at least one intermediate layer 16 interposed between the two previously described layers which is capable of achieving a suitable homogeneous bond between itself and the two respective layers 14, 12.

Although it is to be understood in the present invention that any suitable extrudable adhesive layer 24 may be used (if necessary) between outer jacket 18 and the inner tubing substrate (which may comprise a mono-layer configuration as in FIG. 1, and/or a multi-layer configuration as in FIGS. 2 and 3), in the preferred embodiment, this intermediate adhesive layer 24 comprises a suitable polyethylene material. One such polyethylene material is a linear low-density polyethylene (LLDPE). It has unexpectedly and fortuitously been discovered that a LLDPE may successfully be used as an adhesive/bonding layer 24 at temperatures at or above 350° F. during crosshead extrusion, without the LLDPE running off, burning and/or flashing off.

One such LLDPE material is commercially available from E.I. DuPont de Nemours and Company of Wilmington, Del. under the trade name BYNEL® adhesive resin. This is an anhydride-modified, linear low-density polyethylene. In the preferred embodiment, the 4100 series is used, and even more preferred is BYNEL® Grade No. 41E558. These BYNEL® resins are available in pellet form for use in extrusion and co-extrusion equipment designed to process polyethylene resins.

Some typical properties of the BYNEL 41E558 resin follow. The melt index, using ASTM test method D1238, 190/2.16 is 1.1 dg/min. The density using ASTM test method D1505 is 0.90 g/cm$^3$. The melt point using ASTM test method DSC,D3418 is 121° C./250° F. The freeze point using ASTM test method DSC,D3418 is 105° C./221° F. The Vicat softening point using ASTM test method D1525 is 86° C./187° F. The BYNEL 4100 series include a hindered phenol antioxidant additive.

For coextrusion with polyamides or other thermally stable resins, the BYNEL melt temperature may be up to about 250° C. (482° F). If adhesion results are adequate, melt temperatures may be lowered. While it is possible to extrude BYNEL series 4100 resins as high as 300° C. (572° F.), such high extrusion temperatures may result in some film imperfections.

It is to be understood that the intermediate adhesion layer 24 may be extruded onto the inner tubing substrate, eg. onto layer 14 in any desired form and/or configuration, including about the entire circumference of the tubing, as shown in FIG. 1. However, in the preferred embodiment, two stripes (the cross section of which are shown in FIG. 2) of the adhesive material 24 are extruded onto the inner tubing substrate, eg. onto outer layer 12, with the stripes placed 180° from each other, i.e. on opposed surfaces of the inner layer 14. Further in the preferred embodiment, each stripe is approximately 0.050 inches wide and approximately 0.006 to 0.008 inches thick. It is to be understood that any number of stripes (the cross section of 4 of which are shown for illustrative purposes in FIG. 3) of the adhesive material 24 may be extruded onto the inner tubing substrate, eg. onto outer layer 12, as desired. The stripes of material 24 are shown symmetrically placed in FIG. 3; however, it is to be understood that this placement is for illustrative purposes only.

In an alternate embodiment, the inner layer 14 may be a permeation resistant, chemical resistant, fuel resistant thermoplastic material which is melt processible in normal ranges of extrusion, i.e. between about 175° C. to about 250° C. As such, the inner layer 14 may alternately consist of a non-polyamide material which is capable of adhesion to a bonding layer 16 interposed between the thick outer layer 12 and the inner layer 14 in a manner which will be described subsequently Thus, the thermoplastic material which comprises the alternate inner layer 14 may be a fluoroplastic material selected from the group consisting of polyvinylidine fluoride, polyvinyl fluoride, polychlorotrifluoroethylene, ethylene tetrafluoroethylene copolymers, a graft copolymer of the preceding materials together with a fluorine-containing polymer such as copolymers of vinylidine fluoride and chlorotrifluoroethane, and mixtures thereof.

The inner layer 14 in the alternate embodiment has a minimum wall thickness sufficient to achieve the permeation resistance desired. In general, the inner layer 14 is thinner than the outer layer 12, with the thickness of the outer layer 12 being between about 50% and about 60% of the total wall thickness of the multi-layer tubing 10. Preferably, the inner wall thickness is between about 0.01 mm and about 0.2 mm with a thickness of about 0.05 mm and about 0.2 mm being preferred, and a thickness between about 0.05 mm and about 0.17 mm being more preferred. The intermediate bonding layer 16 generally may have a thickness less than or equal to that of the inner layer 14.

The thermoplastic material employed in the inner layer 14 of the alternate embodiment is capable of serving as a hydrocarbon barrier to prevent significant permeation of the aromatic and aliphatic components of gasoline through to an alternate outer layer 12 composed of polyamide and thus, out to the surrounding environment.

Some suitable fluoroplastic materials include polyvinylidine fluoroplastic derived from the thermal dehalogenation of chlorodifluoroethane, commercially available under the tradenames "FLORAFLON" and "KYNAR" from Atochem Inc. elf Aquitaine Group of Philadelphia, Pa. A suitable ethylene tetrafluoroethylene copolymer employed herein is derived from the copolymerization of ethylene with tetrafluoroethylene. The preferred polymeric material has an ethylene-derived content between about 40% and about 70% and a tetrafluoroethylene content between about 30% and about 60% by total polymer weight with minor amounts of proprietary materials being optionally present. Suitable materials are commercially available under the tradenames "TEFZEL 210", "TEFZEL 200", and "TEFZEL 280" from E.I. duPont de Nemours, Co. of Wilmington, Del.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area, gradually eroding the area and leading to eventual rupture of the tubing. Such a rupture of the tubing can lead to the danger of fire and explosion of the flammable contents of the tubing.

The inner layer 14 of the present invention may, as illustrated in FIG. 3, include an innermost electrostatic dissipation sub-layer 22 which is also capable of serving as a hydrocarbon barrier to assist in the prevention of permeation of aromatic and aliphatic compounds found in gasoline through to the outer layer 12 of the tubing 10 and, thus, out to the surrounding environment The electrostatic dissipation sub-layer 22 of the inner layer 14 may be integrally bonded to the inner surface of an optional sub-layer 20 disposed between sub-layer 22 and the intermediate bonding layer 16. Preferably, the sub-layers 20 and 22 are chemically similar materials in structure and composition. As used here, the term "chemically similar material" is defined as a thermoplastic material selected from the group consisting of polyvinylidine fluoride, polyvinyl fluoride, a graft copolymer of the preceding materials together with a fluorine-containing polymer such as copolymers of vinylidine fluoride and chlorotrifluoroethane, a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer, and mixtures thereof. Preferably, the sub-layers 20 and 22 are composed of the same material, with the exception of the electrostatic dissipation sub-layer 22 including additional conductive material as described hereinafter. The sub-layers 20 and 22, intermediate bonding layer 16, outer layer 12 and jacket 18 define a five layer tubing 10.

In a preferred embodiment, sub-layer 22 comprises conductive Nylon 12 (PA 12); sub-layer 20 comprises Nylon 12 (PA 12); intermediate layer 16 comprises polyvinylidene fluoride (PVDF); outer layer 12 comprises Nylon 12 (PA 12); and outer jacket 18 comprises a thermoplastic elastomer (eg. SANTOPRENE® #101-73).

The thermoplastic material which comprises the electrostatic dissipation sub-layer 22 of the inner layer 14 is selected from the group consisting of: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer. The sub-layer 22 thermoplastic material employed in the present invention preferably contains between about 10% and about 18% by weight of a vinylidine fluoride-chlorotrifluoroethylene copolymer, which itself has a vinylidine fluoride content between about 40% and 60% by copolymer weight. The material also preferably contains between about 50% and about 70% by weight of a vinylidine fluoride-tetrafluoroethylene copolymer. The non-fluorinated elastomer is selected from the group consisting of polyurethanes and mixtures thereof. The sub-layer 22 thermoplastic material may contain between about 10% and about 25% by weight polyurethane.

The sub-layer 22 thermoplastic material also preferably contains conductive media in quantities sufficient to permit electrostatic dissipation in a desired range. The electrostatic dissipation sub-layer 22 of the inner layer 14 exhibits electrostatic dissipative characteristics capable of dissipating electrostatic charges in the range of between about $10^4$ and $10^9$ Ohm/cm$^2$. Suitable material is commercially available under the tradename XPV-504KRC CEFRAL SOFT CONDUCTIVE.

The electrostatic dissipation sub-layer 22 of the inner layer 14 is maintained at thicknesses suitable for achieving static dissipation and suitable laminar adhesion respectively; generally between about 10% and 20% of the thick outer layer 12. The thickness of the electrostatic dissipation sub-layer 22 of the inner layer 14 is preferably between about 0.1 mm and about 0.2 mm. The intermediate bonding layer 16 preferably has a thickness approximately equal to the thickness of the electrostatic dissipation sub-layer 22, preferably between about 0.05 mm and about 0.15 mm.

In any of the embodiments disclosed, at least one layer, preferably the inner layer 14 and/or the intermediate bonding layer 16, may exhibit dissipative characteristics, rendering it capable of dissipation of electrostatic charge in the range of $10^4$ to $10^9$ Ohm/cm$^2$, The fluoroplastic material employed in the conductive layer of the present invention may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel, highly conductive metals such as copper, silver, gold, nickel, silicon, and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing 10. In the preferred embodiment, the fluoroplastic material contains conductive material in an amount sufficient to effect electrostatic dissipation. However, the maximum amount employed therein is less than 5% by volume with a concentration between about 2% and about 4% being preferred.

The conductive material can either be blended into the melt-processible fluoroplastic material so as to be interstitially integrated into the crystalline structure of the polymer or can be incorporated during polymerization of the monomers that make up the fluoroplastic material. Without being bound to any theory, it is believed that carbon-containing materials such as carbon black may be incorporated during co-polymerization of the surrounding fluoroplastic material Material such as stainless steel are more likely to be blended into the crystalline structure of the polymer.

In each of the embodiments, the intermediate bonding layer 16 is composed of a thermoplastic material which also exhibits properties of resistance to permeation of aliphatic and aromatic materials such as those found in fuel The thermoplastic material employed herein is preferably a melt-processible co-extrudable thermoplastic which may or may not contain various plasticizers and other modifying agents.

The intermediate bonding layer 16, in addition to permitting a homogeneous bond between the inner layer 14 and outer layer 12, and exhibiting resistance to permeation of fuel components, also may exhibit conductive or static dissipative characteristics such as those described previously. Thus, the intermediate bonding layer 16 may optionally include sufficient amounts of conductive media to effect electrostatic dissipation in the range of $10^4$ to $10^9$ Ohm/cm$^2$. As with the inner layer 14, the intermediate bonding layer 16 may be inherently electrostatically dissipative or may be rendered so by the inclusion of certain conductive material such as those selected from the group consisting of elemental carbon, stainless steel, copper, silvers gold, nickel, silicon and mixtures thereof.

It is preferred that the inner layer 14 and the bonding layer 16 be maintained at the minimum thickness necessary to prevent permeation of the fuel through the tubing material. It is preferred that the amount of hydrocarbon permeation through the tubing 10 be no greater than 0.5 gm/m$^2$ in a 24 hour interval. The thickness of the inner layer 14 can be varied to accomplish this end.

In a preferred embodiment, the intermediate bonding layer 16 is a fluoroplastic material selected from the group consisting of polyvinylidine fluoride, polyvinyl fluoride, polyvinyl acetate-urethane blends, and mixtures thereof. One preferred fluoroplastic material is a polyvinylidine derived from the thermal dehalogenation of chlorodifluoroethane. One preferred non-fluorocarbon material is a polyvinyl acetate/urethane blend. The material of choice exhibits an affinity to polymers employed in the outer layer such as Nylon 12 or Nylon 6. Suitable fluoroplastic materials are commercially available under the tradename "ADEFLON A"; while suitable non-fluoroplastic materials are commercially available under the tradename "ADEFLON D" both from Atochem Inc. elf Aquitaine Group of Philadelphia, Pa.

The intermediate bonding layer 16 may also be composed of a thermoplastic material which may exhibit properties of resistance to the permeation of aliphatic and aromatic materials such as those found in fuel in addition to exhibiting suitable bonding characteristics Such a suitable layer 16 material employed herein is preferably a melt-processible co-extrudable fluoroplastic blend which will exhibit an affinity to conventional polymers such as Nylon 12, and may optionally contain various plasticizers and other modifying agents. The fluoroplastic which comprises the intermediate bonding layer 16 in the alternate embodiment is selected from the group consisting of: a polyvinyl fluoride compound selected from the group consisting of polyvinylidine fluoride polymers, polyvinyl fluoride polymers, and mixtures thereof; a vinylidine fluoride-chlorotrifluoroethylene copolymer; and a polyamide material selected from the group consisting of 12 carbon block polyamides, 11 carbon block polyamides, 6 carbon block polyamides, and mixtures thereof The vinylidine fluoride-chlorotrifluoroethylene copolymer preferably, contains between about 60% and about 80% by weight polyvinylidine difluoride. The intermediate bonding layer 16 consists essentially of between about 35% and about 45% by weight of a copolymer of vinylidine fluoride and chlorotrifluoroethylene; between 25% and about 35% by weight polyvinylidine fluoride; and between about 25% and about 35% by weight of a polyamide selected from the group consisting of 12 carbon block polyamides; 11 carbon block polyamides, and mixtures thereof One such polymeric material suitable for use in the multi-layer tubing 10 of the present invention is commercially available from Central Glass of Ube City, Japan under the trade designation CEFRAL SOFT XUA-2U. This material is a graft copolymer of a fluorine-containing elastomeric polymer with a fluorine-containing crystalline polymer. The elastomeric polymer is, preferably, a material copolymerized from an alkyl difluoride selected from the group consisting of vinyl difluoride, vinylidine difluoride, and mixtures thereof, and a chlorofluoroalkene selected from the group consisting of ethylene chlorotrifluoroethylene. The crystalline polymer is preferably a haloalkene such as ethylene chlorotrifluoroethylene.

The thermoplastic material which comprises the intermediate bonding layer 16 may alternately be a thermoplastic material selected from the group consisting of co-polymers of substituted or unsubstituted alkenes having less than four carbon atoms and vinyl alcohol, alkenes having less than four carbon atoms and vinyl acetate, and mixtures thereof. This thermoplastic material will be resistant to permeation by and interaction with short chain aromatic and aliphatic compounds such as those which would be found in gasoline. The preferred material is a copolymer of ethylene and vinyl alcohol which has an ethylene content between about 27% and about 35% by weight with an ethylene content between about 27% and about 32% being preferred. Examples of suitable materials which can be employed in the tubing of the present invention include: ethylene vinyl alcohol commercially available from EVA/LA.

Outer jacket 18 may, preferably, exhibit conductive characteristics in that it is capable of dissipation of electrostatic charge in the range of $10^4$ to $10^9$ Ohm/cm$^2$. The material which composes the outer jacket 18 may be inherently conductive in these ranges or, preferably, include in its composition a conductive media in sufficient quantity to permit electrostatic dissipation in the range defined Suitable conductive media are recited hereinabove.

The amount of conductive material contained in the outer jacket 18 is generally limited by considerations of low temperature durability and resistance to the degradative effects of the gasoline or fuel passing through the tubing. The jacket 18 contains conductive material in an amount sufficient to effect electrostatic dissipation. However, the maximum amount employed therein is preferably less than about 5% by volume.

Figure 4:
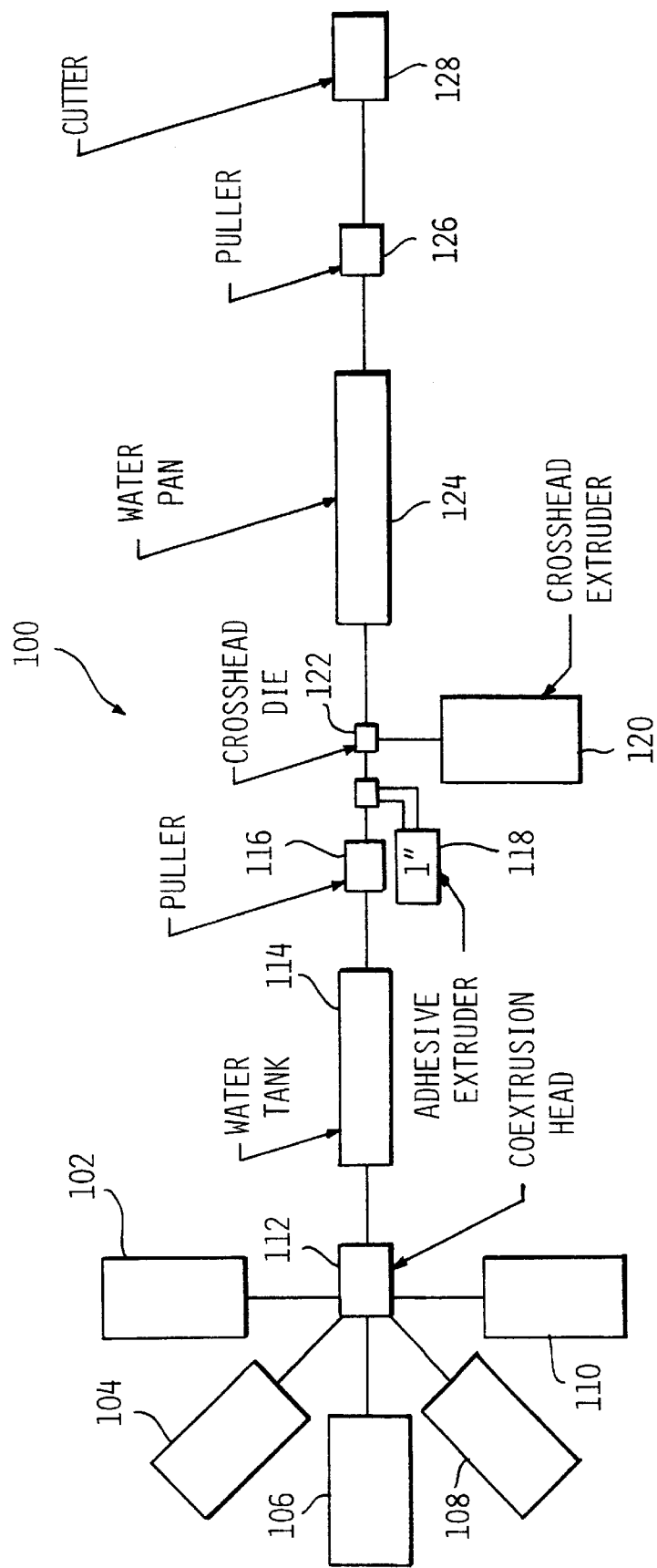
FIG. 4 is a schematic diagram showing the process of the present invention.

Referring now to FIG. 4, there is shown a schematic diagram 100 of the process of the present invention. The process of the present invention comprises the step of extruding at least one polymeric material into a suitable tubing configuration comprising at least one layer (eg. layers 14, 22, 20 and/or 12), as desired. This extrusion is carried out via extruder 102. If more than one material is extruded (as in, for example, FIG. 3), these materials are extruded via at least two of extruders 104, 106, 108 and/or 110. It is to be understood that fewer or any number of extruders may be used as desired. If more than one extruder is used, the materials are then run through a co-extrusion head 112. The process then comprises the step of quenching via, for example, a water tank 114. The (co) extruded tubing 14 is then sent through a puller 116, after which is it run through an adhesive extruder 118 to apply an intermediate adhesive layer 24.

The process of the present invention further comprises the step of extruding at a temperature of about 350° F. via a cross head extruder 120 and a cross head die 122 a suitable thermoplastic material layer 18 about the entire circumference of the inner tubing substrate, with the adhesive layer 24 therebetween. The layer 18, e.g. TPE, is thereby adhered to the underlying tubing substrate, e.g. Nylon 12 tubing. As stated above, it is to be understood that the layer 24 may be applied over a mono-layer tube 14 (as in FIG. 1); and/or over a multi-layer tube (as in, for example, FIGS. 2 and 3).

The process of the present invention further comprises the step of quenching the multi-layer tubing via a suitable water pan 124. The tubing is then sent through a second puller 126, and is then cut, if desired, to any suitable length via cutter 128, or coiled (not shown).

The following is a brief description of the various exemplary, commercially available compounds suitable for use in the present invention. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

UNIPRENE, commercially available from Teknor Apex of Pawtucket, R.I., is a thermoplastic vulcanizate which performs like cured EPDM rubber, but processes with the ease and speed of thermoplastic olefins. UNIPRENE thermoplastic vulcanizates have mechanical and recovery properties comparable to most vulcanized elastomers, and may be superior to many TPEs.

ADEFLON A is a polyvinylidene fluoride commercially available from Atochem Inc. elf Aquitaine Group of Philadelphia, Pa. Its typical use is as a binding material for polyamides/polyvinylidene fluoride The product is stable under normal use conditions, and above 230° C., there is a release of monomer traces. Physical properties include: at 20° C. the material is a granulated solid having a white/slightly yellow color and no odor. The crystal melting point is 175° C., and beginning of decomposition is 230° C. In water at 20° C., the product is non-soluble. The density at 20° C. bulk is 1 to 1.1 g/cm$^3$.

The Vichem Corporation vinyl compounds are polyvinyl chloride compounds composed of a vinyl resin and functioning additives. The ingredients include a stabilizer, a resin CAS No. 75-01-4, a plasticizer CAS No. 68515-49-1, an epoxy soya oil CAS No. 8013-07-8, a filler CAS No. 1317-65-3 and carbon black CAS No. 133385-4. The specific gravity is 1.35 and the compound has the appearance of pellets and has a characteristically bland odor.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

KYNAR, commercially available from Atochem Inc. elf Aquitaine Group of Philadelphia, Pa., is a vinylidene fluoride-hexafluoropropylene copolymer. Its chemical name is 1-propene,1,1,2,3,3,3-hexafluoro-1,1-difluoroethene polymer. Its melting point is 155°–160° C. Its specific gravity is 1.77–1.79 at 23° C. It appears translucent and has no odor.

A suitably conductive KYNAR material, known as KYNAR RC 10,098 is also commercially available from Atochem Inc. elf Aquitaine Group of Philadelphia, Pa. This compound is identified as a hexafluoropropylene-vinylidine fluoride copolymer, CAS No. 9011-17-0. The melting point is between about 155° C. and about 160° C. It is not soluble in water. It appears as translucent pellets having no odor. It is stable under 300° C.

CEFRAL SOFT XUA-2U, commercially available from Central Glass Company, Ltd., Chiyodaku, Tokyo, Japan is a copolymer containing 40% vinylidene fluoridechlorotrifluoroethylene copolymer, 30% polyvinylidene fluoride and 30% Nylon 12. The material has a specific gravity of 1.45 at 23° C., a melting point of 173° C. and a mold temperature of 220° F. The material has an elongation at break of 478% and a tensile strength of 430 Kgf/cm$^2$.

XPV-504 KRC CEFRAL SOFT CONDUCTIVE is commercially available from Central Glass Company, Ltd., Chiyodaku, Tokyo, Japan and is a polymeric composition containing 14% vinylidene fluoridechlorotrifluoroethylene copolymer; 63% vinylidene fluoride-tetrafluoroethylene copolymer; 20% polyurethane elastomer; and 3% carbon black. The material has a melt point of 165° C. and a specific gravity of 1.80 at 23° C.

TEFZEL is commercially available from DuPont Polymers, Specialty Polymer Division, Wilmington, Del. The material designates a family of ethylene tetrafluoroethylene fluoropolymers having various commercial grades. The material has a melting point between 255° C. and 280° C. as determined by ASTM method DTA D3418. The specific gravity for the material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 for all grades of TEFZEL is D70. Tensile strength at 73° F. is between 5,500 psi and 7,000 psi. TEFZEL was first introduced in 1970 having outstanding mechanical strength, high temperature and corrosion resistance. The material is available in three production grades, TEFZEL 200, TEFZEL 210 and TEFZEL 280 which can be applied in the present invention. Ultimate elongation at break is between 150% and 300%, depending on the grade as determined by ASTM method D638.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An elongated multi-layer tubing for connection to a motor vehicle system to handle fluids containing hydrocarbons, the tubing comprising:

an inner layer disposed radially innermost and having an inner surface capable of prolonged exposure to a fluid containing hydrocarbons, the inner layer consisting essentially of an extrudable, melt-processible thermoplastic material which is resistant to permeation by hydrocarbons;

an outer jacket layer consisting essentially of an extrudable, melt-processible thermoplastic material; and an intermediate layer extruded between the inner layer and the outer jacket, the intermediate layer sufficiently adhering the inner layer to the outer jacket, wherein the intermediate layer is formed from an anhydride-modified, linear low-density polyethylene;

wherein at least one layer of the tubing is capable of dissipating electrostatic energy.

2. The tubing of claim 1 wherein the tubing has a passive hydrocarbon permeation rate less than about 0.5 g/m$^2$ in a 24 hour interval.

3. The tubing of claim 1 wherein the at least one layer contains quantities of a conductive material sufficient to provide electrostatic dissipation capability in a range between about $10^4$ to $10^9$ Ohm/cm$^2$.

4. The tubing of claim 3 wherein the conductive material is selected from the group consisting of elemental carbon, copper, silver, gold, nickel, silicon, and mixtures thereof.

5. The tubing of claim 4 wherein the conductive material is elemental carbon and is incorporated during polymerization of monomers that make up the at least one layer.

6. The tubing of claim 4 wherein the conductive material is present in an amount less than about 5% by volume of the at least one layer.

7. The tubing of claim 6 wherein the conductive material is blended into the at least one layer.

8. The tubing of claim 1 wherein the inner layer melt-processible thermoplastic material is selected from the group consisting of Nylon 11, Nylon 12, zinc chloride resistant Nylon 6, thermoplastic elastomers, and mixtures thereof.

9. The tubing of claim 1 wherein the inner layer melt-processible thermoplastic material contains as a major constituent a fluoroplastic material selected from the group consisting of polyvinylidine fluoride, polyvinyl fluoride, polychlorotrifluoroethylene, ethylene tetrafluoroethylene copolymers, a graft copolymer with a fluorine-containing polymer such as copolymers of vinylidine fluoride and chlorotrifluoroethane, a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer, and mixtures thereof.

10. The tubing of claim 1 wherein the outer jacket layer melt-processible thermoplastic material is selected from the group consisting of Nylon 11, Nylon 12, zinc chloride resistant Nylon 6, polyether block amides, thermoplastic elastomers, and mixtures thereof.

11. The tubing of claim 1 wherein the inner layer is formed from Nylon 12 and the outer jacket layer is formed from a thermoplastic elastomer.

12. The tubing of claim 1 wherein the intermediate layer is able to withstand a temperature of at least about 350° F. while imparting sufficient adherence characteristics between the inner layer and the outer jacket.

13. An elongated multi-layer tubing for connection to a motor vehicle system to handle fluids containing hydrocarbons, the tubing comprising:

an inner layer disposed radially innermost and having an inner surface capable of prolonged exposure to a fluid containing hydrocarbons, the inner layer consisting essentially of an extrudable, melt-processible thermoplastic material selected from the group consisting of Nylon 11, Nylon 12, zinc chloride resistant Nylon 6, thermoplastic elastomers, and mixtures thereof, wherein the inner layer is resistant to permeation by hydrocarbons;

an outer jacket layer consisting essentially of an extrudable, melt-processible thermoplastic material selected from the group consisting of Nylon 11, Nylon 12, zinc chloride resistant Nylon 6, polyether block amides, thermoplastic elastomers, and mixtures thereof; and an anhydride-modified, linear low-density polyethylene intermediate layer extruded between the inner layer and the outer jacket layer, the intermediate layer sufficiently adhering the inner layer to the outer jacket;

wherein at least one layer of the tubing is capable of dissipating electrostatic energy.

14. The tubing of claim 13 wherein the inner layer is formed from Nylon 12 and the outer jacket layer is formed from a thermoplastic elastomer.

15. An elongated multi-layer tubing for connection to a motor vehicle system to handle fluids containing hydrocarbons, the tubing comprising:

an inner layer disposed radially innermost and having an inner surface capable of prolonged exposure to a fluid containing hydrocarbons, the inner layer consisting essentially of an extrudable, melt-processible thermoplastic material;

an outer layer consisting essentially of an extrudable, melt-processible thermoplastic material which is resistant to ultra violet degradation, extreme changes in heat, and exposure to gasoline and its additives;

a first intermediate layer interposed between, and uniformly connected to the inner layer and the outer layer and consisting essentially of an extrudable, melt-processible thermoplastic material capable of sufficiently permanent laminar adhesion with the inner and outer layers to substantially prevent delamination during a desired lifetime of said tubing, at least one of the inner and intermediate layers resistant to permeation by hydrocarbons;

an outer jacket layer overlying the outer layer and consisting essentially of an extrudable, melt-processible thermoplastic material; and a second intermediate layer formed from an anhydride-modified, linear low-density polyethylene and extruded between the outer layer and the outer jacket, the second intermediate layer sufficiently adhering the outer layer to the outer jacket, with at least one of the inner and first intermediate layers resistant to permeation by hydrocarbons;

wherein at least one layer of the tubing is capable of dissipating electrostatic energy.

16. The tubing of claim 15 wherein the second intermediate layer is able to withstand a temperature of at least about 350° F. while imparting sufficient adherence characteristics between the outer layer and the outer jacket.

17. The tubing of claim 16, further comprising an electrostatic dissipation layer integrally bonded to the inner surface of the inner layer.

18. The tubing of claim 17, wherein the electrostatic dissipation layer consists essentially of conductive Nylon 12; the inner layer consists essentially of Nylon 12; the first intermediate layer consists essentially of polyvinylidene fluoride (PVDF); the outer layer consists essentially of Nylon 12; and the outer jacket layer consists essentially of a thermoplastic elastomer.

* * * * *